United States Patent
Nachlieli et al.

(10) Patent No.: US 8,594,383 B2
(45) Date of Patent: Nov. 26, 2013

(54) METHOD AND APPARATUS FOR EVALUATING PRINTED IMAGES

(75) Inventors: Hila Nachlieli, Haifa (IL); Doron Shaked, Tivon (IL); Shai Druckman, Rehovot (IL); Maya Shalev, Tel Aviv (IL); Yaniv Yona, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1007 days.

(21) Appl. No.: 12/472,523

(22) Filed: May 27, 2009

(65) Prior Publication Data
US 2010/0303305 A1  Dec. 2, 2010

(51) Int. Cl.
*G06K 9/00*  (2006.01)
*G06K 9/40*  (2006.01)

(52) U.S. Cl.
USPC ............ 382/112; 382/254; 382/275

(58) Field of Classification Search
USPC ......... 382/100, 112, 162, 167–168, 254, 275; 358/1.13, 1.9, 296–298, 504, 518–523, 358/260; 348/223.1, 241, 252, 231.99, 348/231.3, 222.1, 231.6; 250/559.04–559.08
See application file for complete search history.

(56) References Cited

U.S. PATENT DOCUMENTS

| | | | | |
|---|---|---|---|---|
| 6,157,735 A | * | 12/2000 | Holub | 382/167 |
| 6,165,170 A | * | 12/2000 | Wynne et al. | 606/9 |
| RE38,716 E | * | 3/2005 | Caspi et al. | 382/141 |
| 7,133,070 B2 | * | 11/2006 | Wheeler et al. | 348/223.1 |
| 2002/0035461 A1 | * | 3/2002 | Chang et al. | 703/13 |
| 2002/0171697 A1 | * | 11/2002 | Gargir et al. | 347/14 |
| 2003/0095197 A1 | * | 5/2003 | Wheeler et al. | 348/241 |
| 2003/0156733 A1 | * | 8/2003 | Zeller et al. | 382/100 |
| 2008/0013848 A1 | | 1/2008 | Wu et al. | |
| 2008/0079959 A1 | * | 4/2008 | Yamazaki | 358/1.8 |
| 2008/0309959 A1 | * | 12/2008 | Martinez et al. | 358/1.13 |
| 2009/0028585 A1 | * | 1/2009 | Guo et al. | 399/15 |
| 2010/0021001 A1 | * | 1/2010 | Honsinger et al. | 382/100 |
| 2010/0232652 A1 | * | 9/2010 | Yeh et al. | 382/112 |
| 2011/0221936 A1 | * | 9/2011 | Steinberg et al. | 348/241 |

FOREIGN PATENT DOCUMENTS

WO  WO 2007/045277  *  4/2007  ............... H04N 1/00

* cited by examiner

*Primary Examiner* — Hadi Akhavannik
*Assistant Examiner* — Mehdi Rashidian

(57) ABSTRACT

A method, diagnostic tool and system are provided for evaluating printing defects. A captured image of a printed sheet is received and a profile generated of the printed sheet, this profile being representative of tonal variations in the printed sheet. The profile is analyzed in a plurality of different scales and an assessment made of the significance of one or more features of a printing defect throughout the plurality of different scales. From the assessed significance of the one or more features, an evaluation is carried out, in each of the plurality of different scales, of the severity of the printing defect.

24 Claims, 11 Drawing Sheets

No neighbors

With neighbor

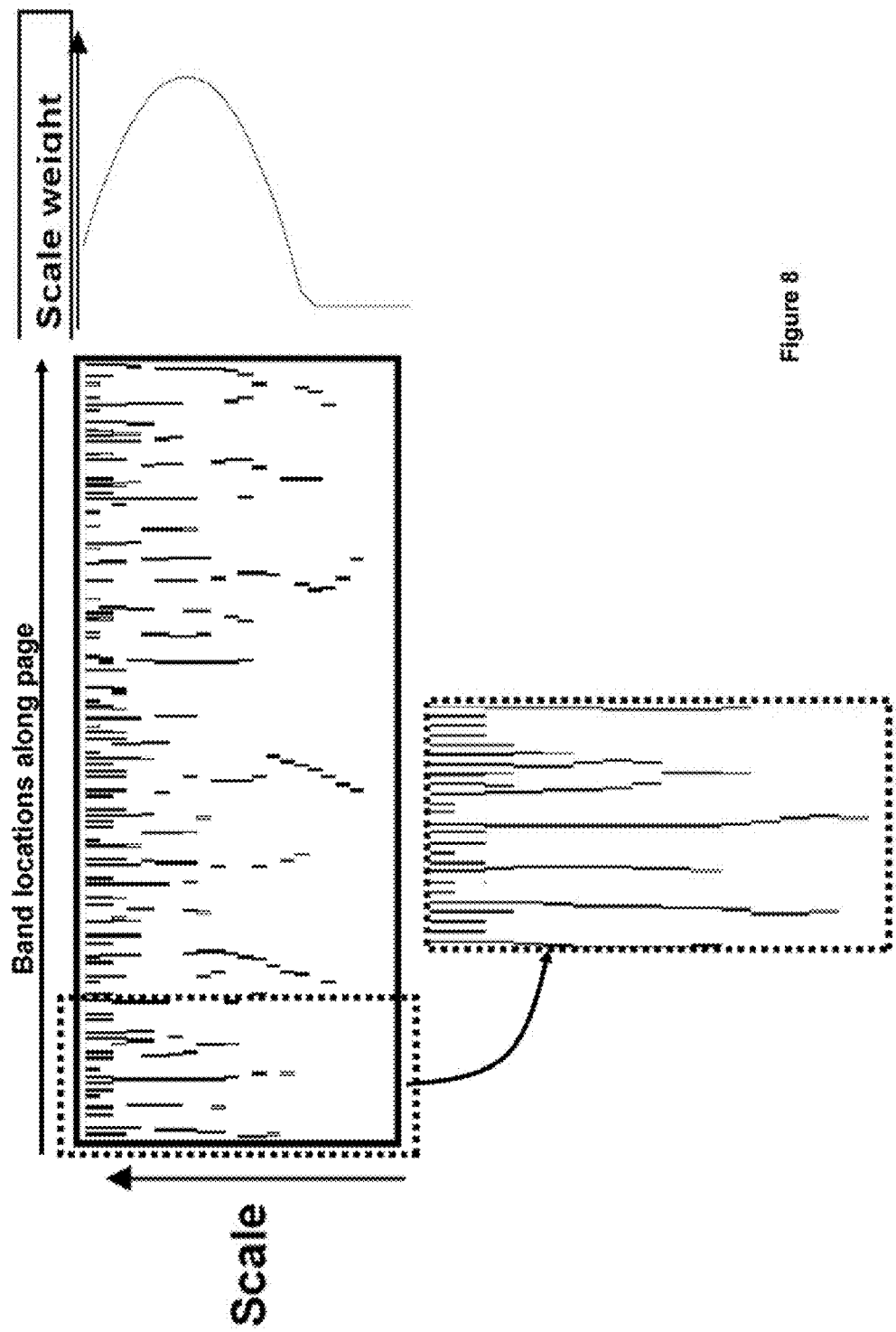

METHOD AND APPARATUS FOR EVALUATING PRINTED IMAGES

BACKGROUND

Printed images may contain printing defects, and this is a known problem associated with printing processes. Examples of printing defects include scratches, spots, missing dot clusters, ink smears, streaks, and band defects.

Band defects (also known as mechanical bands) are visually noticeable tone fluctuations that usually appear as horizontal or vertical stripes across a printed sheet of paper (page). These bands, and other printing defects, can be caused in printing processes as a result of process speed variations, machine vibrations, drum impact, and other mechanical, physical, chemical, environmental, and algorithmic instabilities. Printing defects are undesirable as they can degrade the perceived quality of the prints. Therefore, there is a requirement to evaluate the severity of printing defects such that corrective measures may be taken to improve the quality of the prints. Furthermore, it is desirable to be able to identify bands and in particular the most problematic bands, so that the cause of these bands may be identified and corrected as a priority.

The severity of bands is currently evaluated manually, by human observers. However, this evaluation is subjective since different observers will have contradicting opinions regarding the severity of the same bands. In addition, human observers' opinions are not reliable and reproducible because many different factors will affect the way humans capture band severity. As a result, a committee of human evaluators is used to define the relative perceptual severity of the bands. In a large committee, conflicts between the opinions of the different observers cancel out, giving a more stable result. However, gathering a committee is often not practical and, as a result, evaluation may typically be carried out by just a few human observers.

An additional disadvantage is that evaluating bands is a difficult, subjective task for the human observer. In addition, it takes the evaluation of many sheets to characterize the state of the printing process, this evaluation task is also time consuming and tedious. Furthermore, in real time applications, such as diagnostic routines which automatically identify problems in a printing press, including identifying the source of a print quality problem on the press, manual evaluation of bands is not practical.

BRIEF DESCRIPTION OF THE DRAWINGS

Embodiments of the invention will now be described, by way of non-limiting example, with reference to the accompanying diagrammatic drawings, in which:

FIG. 8 is a logarithmic representation of the scale space showing the band locations along the page, corresponding to the bands shown in FIGS. 1a to 1c, and representations of the maximal values of the bands at each scale;

DETAILED DESCRIPTION

Figure 1A:
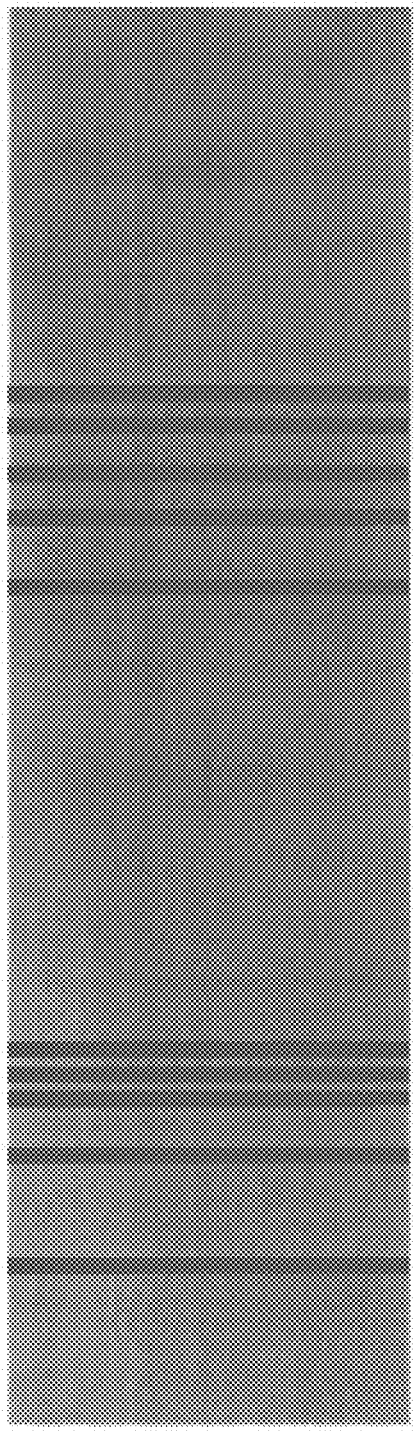
FIG. 1a is a basic printed test pattern containing bands.

FIG. 1a is a test pattern of a grey image comprising horizontal lines being approximately 100 microns thick. The printed test pattern is a uniform grey tone. This test pattern is used for visual band assessment because it enhances the visibility of otherwise less noticeable bands, and any bands generated by the printing process will appear as different grey tones in the printed image.

Figure 1B:
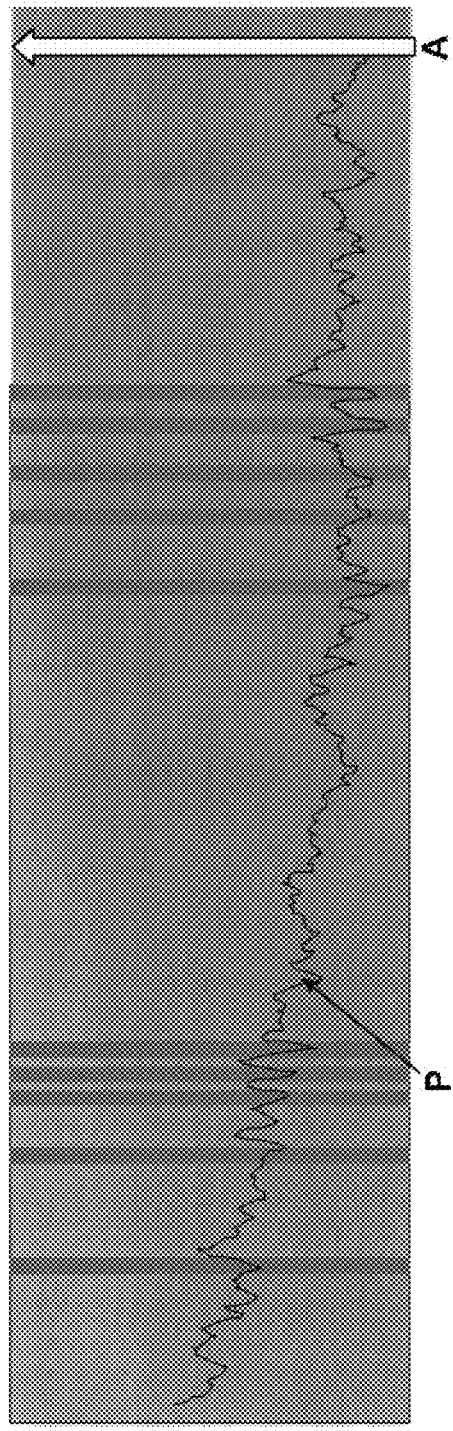
FIG. 1b is a replication of the printed test pattern of FIG. 1a including an overlay of a mean grey level profile.
Figure 1C:
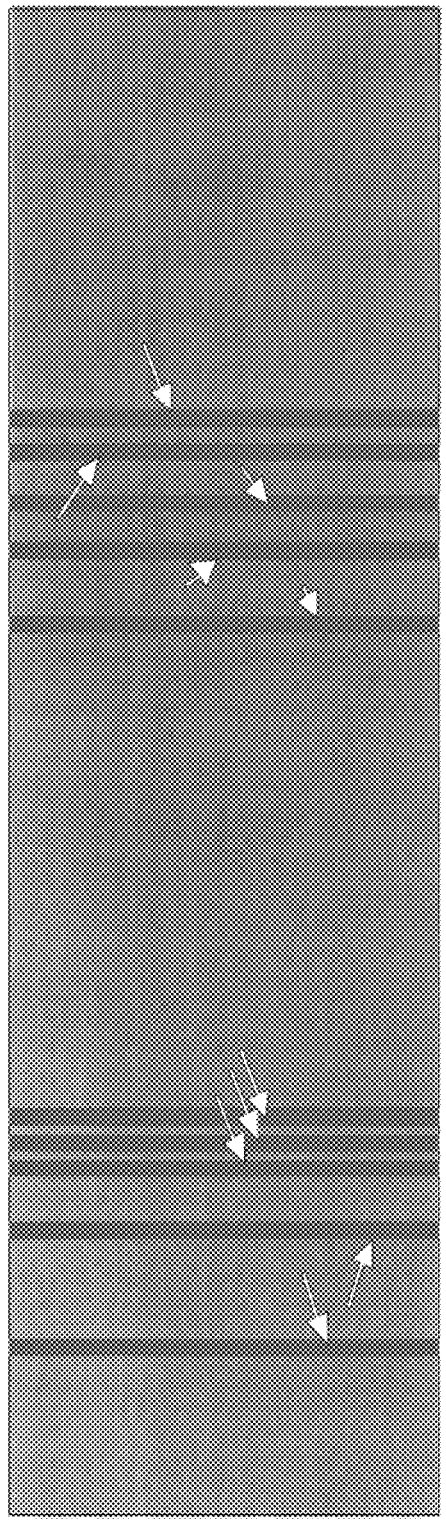
FIG. 1c is a is a replication of the printed test pattern of FIG. 1a including a plurality of arrows highlighting the most severe bands.

Bands, as shown in FIG. 1b, may come in a variety of width, shapes, intensity and neighborhoods. Typical bands are non-periodical, appear across the page (from side to side of an A3 sheet of paper, but running from top to bottom in FIGS. 1b and 1c), and are wider than 2 mm, which makes them noticeable from a normal viewing distance. For clarity, FIG. 1c is a reproduction of FIG. 1a, with arrows pointing to a plurality of the most severe bands.

Figure 1D:
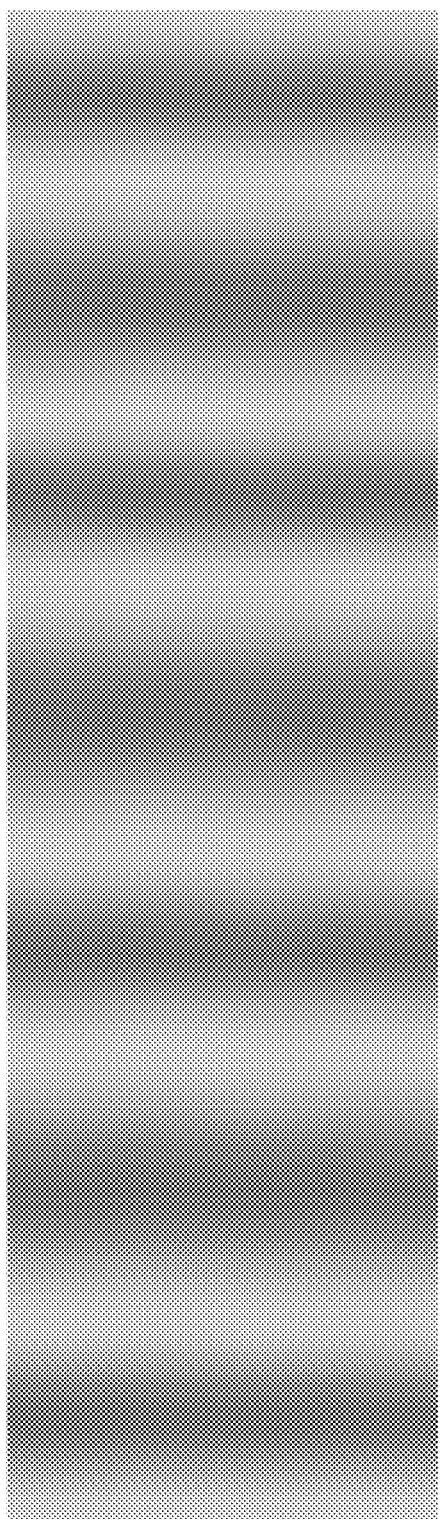
FIG. 1d is an example of a printed test pattern showing exaggerated bands.

FIG. 1d is a representation of a printed test sheet showing a plurality of exaggerated bands (light and dark). This image is exaggerated for the purpose of reproduction/publication of this document. However, a person skilled in the art will appreciate that in real-life the bands are more subtle than those shown in FIG. 1d, and as such the relative severity of the bands is harder to measure/quantify.

As shown in FIGS. 1a to 1d, the bands are variations in intensity of the grey-scale in the printed test pattern. The inventors of the present invention have appreciated that in order to identify bands automatically, and to evaluate the relative severity of bands in a given printed sheet, it is necessary to evaluate features of the bands and to be able to discern those factors which effect the perceived severity of the bands, in relation to the other bands.

Furthermore, in order to be able to identify and rank the severity of the bands it is important to determine which of the various bands' features influence human ranking, and how that ranking is affected. Perceptual band severity is defined by human observers, who sub-consciously capture the many features of the band, and compare them, in order to rank them in order of severity. Due to the subjective nature of band evaluation, identifying the most problematic bands, and therefore the bands which are of a highest priority to remedy, is a not a trivial task.

As a first step to determining the various bands' features it is possible to obtain a profile of one or more printed sheets. Each printed sheet is scanned and analysed independently. Results for a plurality of printed and scanned sheets may be collated after analysis in order to provide further evaluation of the presence of bands, for example, to gain a measure for the percentage of sheets in a group which have a noticeable band in a particular location.

After a page is printed and scanned a mean grey value for each location along the sheet is generated by averaging the grey-scale intensity along the band direction (see Arrow A in FIG. 1b). The mean grey value is plotted along the length of the page to generate the profile, an example of which is shown by the line referenced P in FIG. 1b.

Figure 2A:
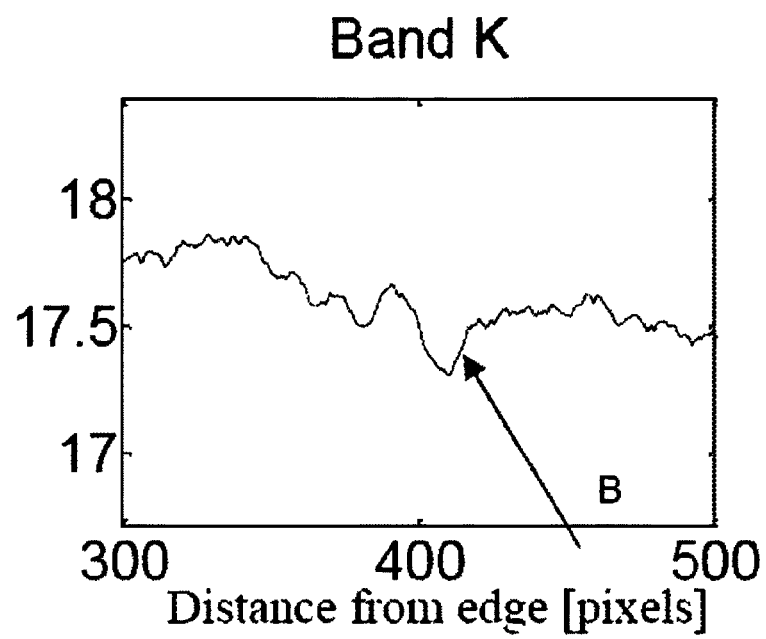
FIGS. 2a and 2b are examples of mean grey level profiles highlighting the differences in features of two different bands.
Figure 2B:
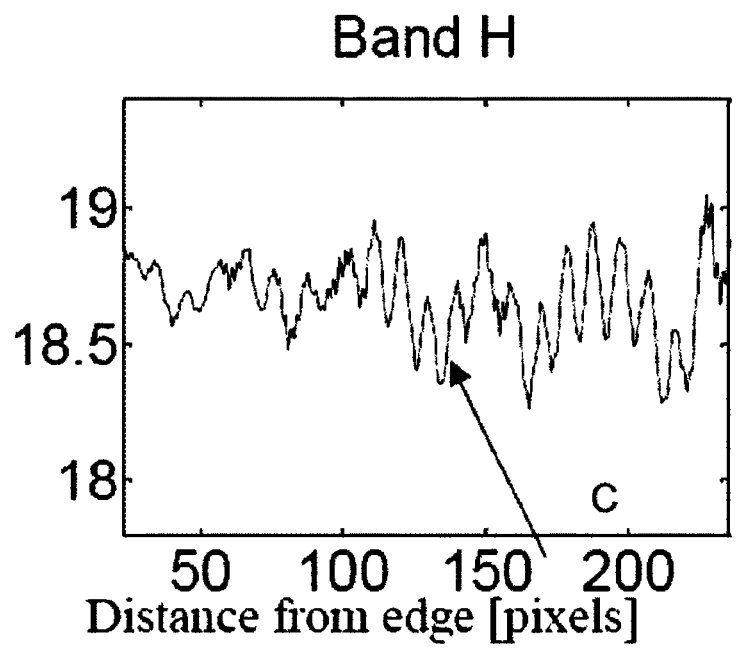

FIGS. 2a and 2b demonstrate the factors which influence the complexity of the task of understanding the features which influence the severity of the bands. FIG. 2a shows the profile of a first printed sheet and Arrow B points to Band K. FIG. 2b shows the profile of a second printed sheet and Arrow C points to Band H. Out of a group of observers, half rated Band K as more noticeable than Band H, and the other half ranked them in the opposite way. As such, it may be deduced that Band K and Band H are of seemingly equal severity.

While the severity of those bands is deemed to be equivalent, their features seem to have nothing in common. Band K is wide and isolated (i.e. there are no bands in the neighborhood of Band K and the band appears to be relatively wide), while B and H is thin and surrounded by other bands. It is the combination of the different features that makes those bands equivalent in terms of severity to the human observer. It is desirable to be able to identify bands with different features, but which are of seemingly equivalent severity.

It is also desirable to be able to identify individual bands and define their approximate boundaries. This task is difficult because some bands that appear to be separated when viewed under close examination can appear to be a single band when viewed at a greater distance. Other bands have vague boundaries making it hard to distinguish them. It is desirable to be able to identify the individual bands such that they can be investigated and corrected.

From the examples in FIGS. 2a and 2b, it is clear that the presence of neighbouring bands has an influence on the perceived severity of a given band. On one hand, neighbouring bands can mask the severity of the band to be evaluated, and on the other hand, neighbouring bands lying between two bands can create a sharpening effect. How the neighbouring bands influence this perceived severity is often subjective. However, it is desirable to be able to compensate for the presence of neighbouring bands such that an accurate reflection of the severity of a given band may be obtained.

One aspect of the present invention resides in a band measurement (MBM) tool for analyzing the severity of the identified bands, in order to produce a ranked list of the bands to be investigated and corrected.

The MBM tool enables analysis of features of the bands by looking at the profile of the printed page at different scales (i.e. equivalent to viewing the profile at different scales). The features of a band are comparatively assessed at different scales and may be comparatively assessed in relation to other bands in the printed sheet.

The MBM tool may have many possible applications, for example during research and development of printing processes, testing of printing presses, or within a printing press diagnosis or a print quality inspection system. As such, the output of the MBM tool may be tailored depending on the particular application. For example, the MBM tool may produce a list of bands in descending severity, and/or a list of locations where the bands are above pre-defined threshold. The MBM tool may also provide the location and severity of the most severe band (also known as the worth band) in the page.

Figure 3:
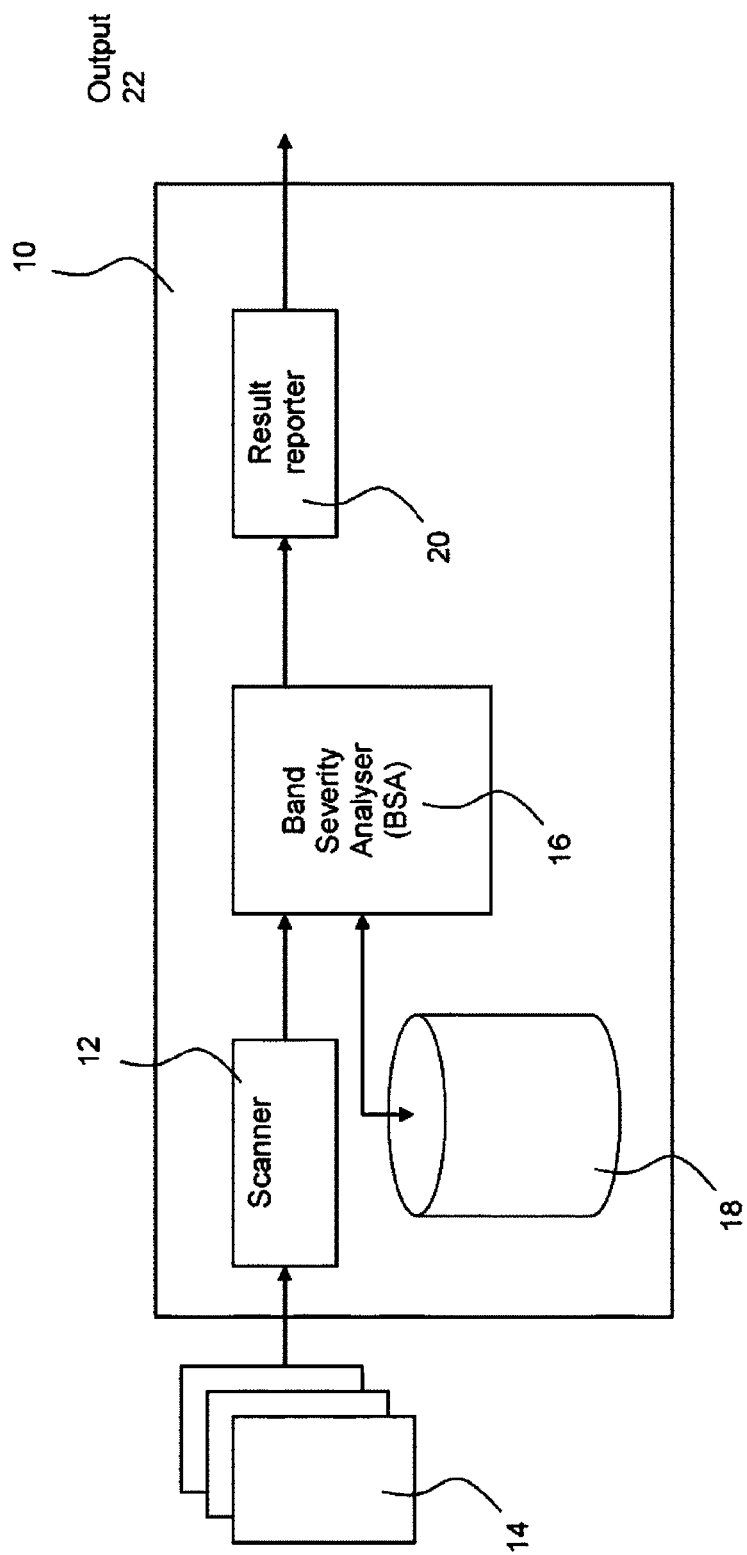
FIG. 3 is a schematic block diagram of the components in an MBM tool according to one aspect of the present invention, comprising a band severity analyzer.

A schematic block diagram of an MBM tool 10 is shown in FIG. 3. As shown, the tool comprises: a scanner 12, for scanning the printed sheets 14; a band severity analyzer (BSA) 16, for performing analysis of the scanned sheets; a memory store 18, for storing the scanned images and additional data required by the band severity analyzer 16; and an output reporting module 20, for generating an output 22 of the MBM tool 10.

Due to variations in printed sheets 14, it is desirable to print, scan and analyse a plurality of sheets 14, for example upwards of thirty sheets. However, for simplicity, the method described below relates to the analysis of one printed sheet.

A test pattern is printed, using the printing press under test, and is captured, using for example an appropriate scanning device 12. The scanner 12 may be a near line scanner, or a scan bar incorporated in the printing press under test. The scanned image is stored in a memory store 18 for future analysis.

Figure 4:
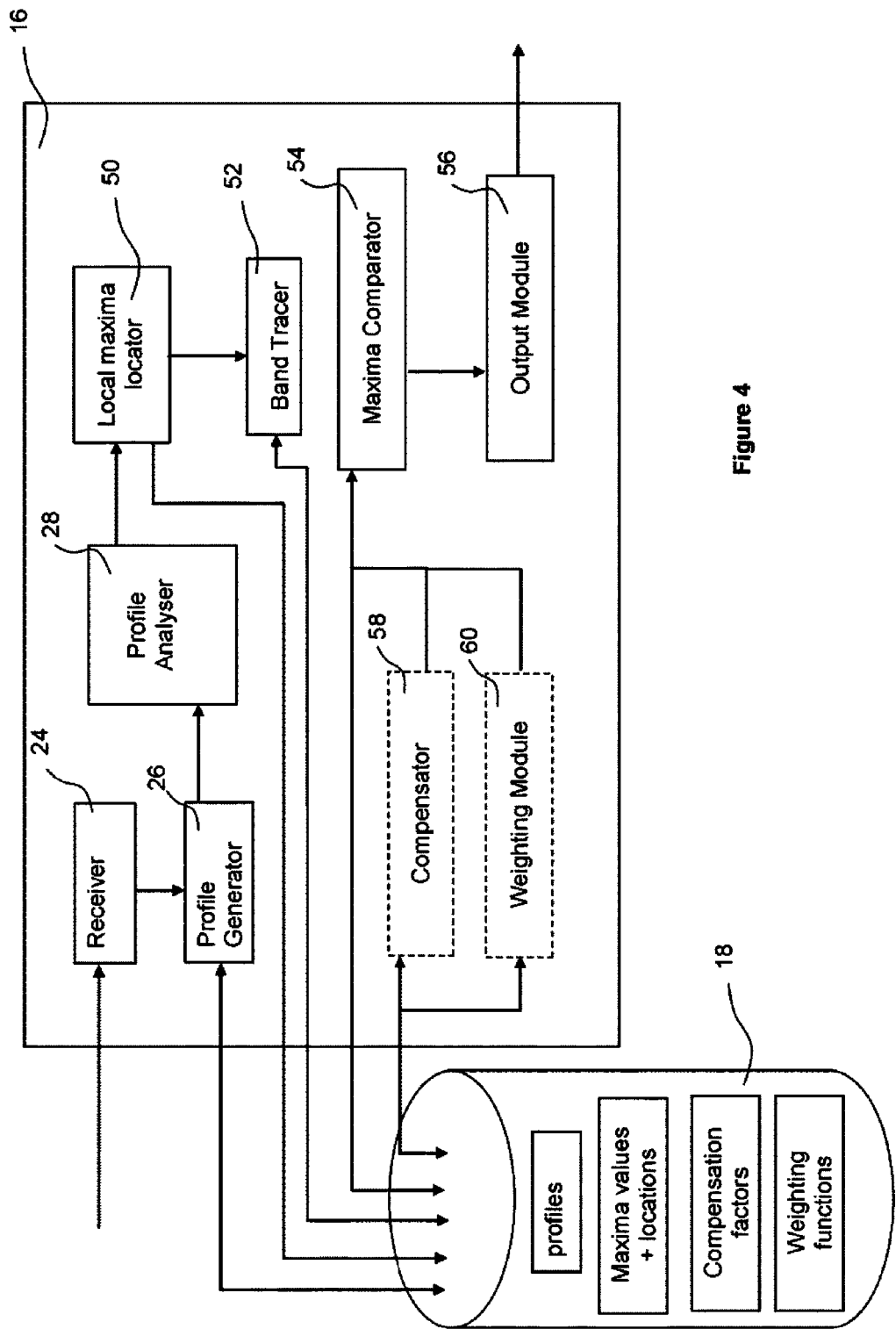
FIG. 4 is a schematic block diagram of the components of the band severity analyzer for FIG. 3.

A schematic block diagram of the BSA 16 of FIG. 3 is shown in FIG. 4. As shown, the BSA comprises: a receiver 24 for receiving images of the scanned sheets; a profile generator 26 for generating the mean grey level profile as described above.

As part of the scanning process, it is possible that the test pattern in the scanned image is at an angle, i.e. the edge of the test pattern is not aligned with the edge of the scanned image. Therefore, the scanned image may be rotated, by the profile generator 26, such that the bands align with and are parallel to the edge of the test pattern.

The BSA 16 in FIG. 4 also comprises a profile analyser 28, for analysing the features of the bands using scale-space theory. Scale-space is a framework for representing a one-dimensional profile, such as the profile P shown in FIG. 1b, in multiple scales. The profile is one-dimensional since it represents the average grey-scale in one direction along the scanned sheet, and is simply a representation of the average grey-scale at each location along the printed sheet.

By analyzing the profile in different scales it is possible to look at features, which belong to a particular band, in each of the different scales. The features of the band throughout the different scales can be compared and a predominant feature is used to determine a severity rating for that band. Repeating this for each of the bands enables determination of a comparative rating for each band in the printed sheet.

The technique described below, using a linear scale-space representation and linear kernels, is one example of the analysis which may occur at the plurality of different scales. However, a person skilled in the art will appreciate that other techniques may be suitable.

For a given image profile $f(x)$ its linear scale-space representation is a family of derived signals $L(x,t)$ defined by the convolution of $f(x)$ with a linear kernel in different scales, $K(t)$.

Figure 5:
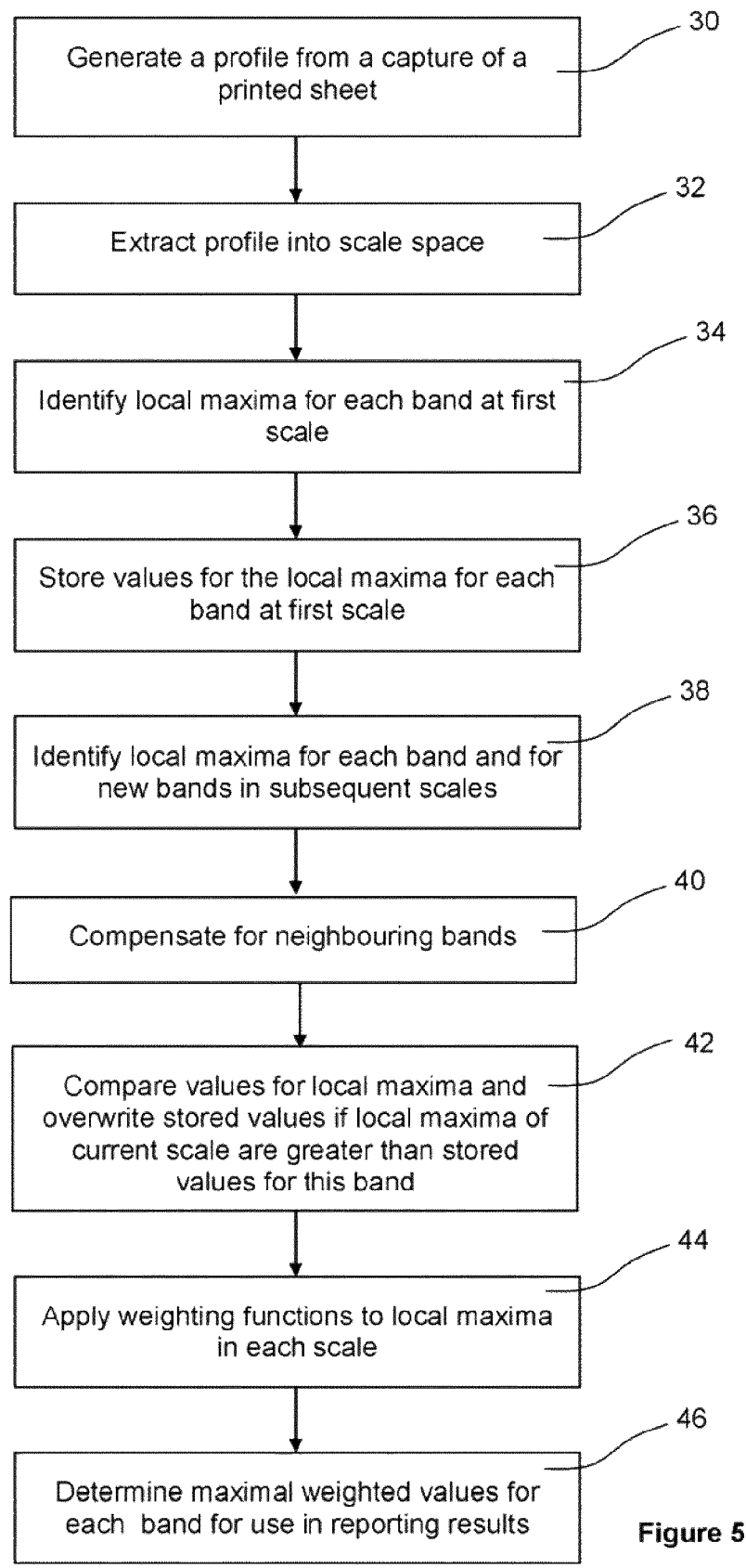
FIG. 5 is a flowchart of the method steps according to another aspect of the present invention.

An overview of the method steps for analyzing the image profile to determine a severity rating of bands in printed sheets is described with reference to FIG. 5.

A profile of a printed and captured (e.g. scanned) sheet comprising a test pattern is generated, at step 30 by the profile generator 26. This profile is extracted, at step 32, into the scale-space. In one embodiment of the present, this is achieved by convolving the profile with the at least one kernel in a plurality of scales. The kernel may be a second derivative of a Gaussian function. However, other kernels may be used.

Figure 6A:
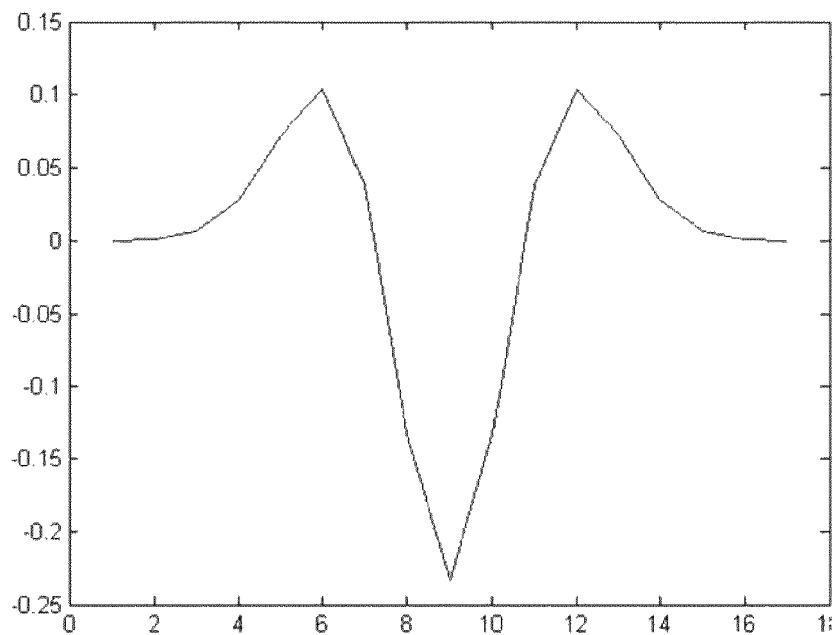
FIGS. 6a and 6b are examples of different kernels showing the second derivative of a Gaussian function.
Figure 6B:
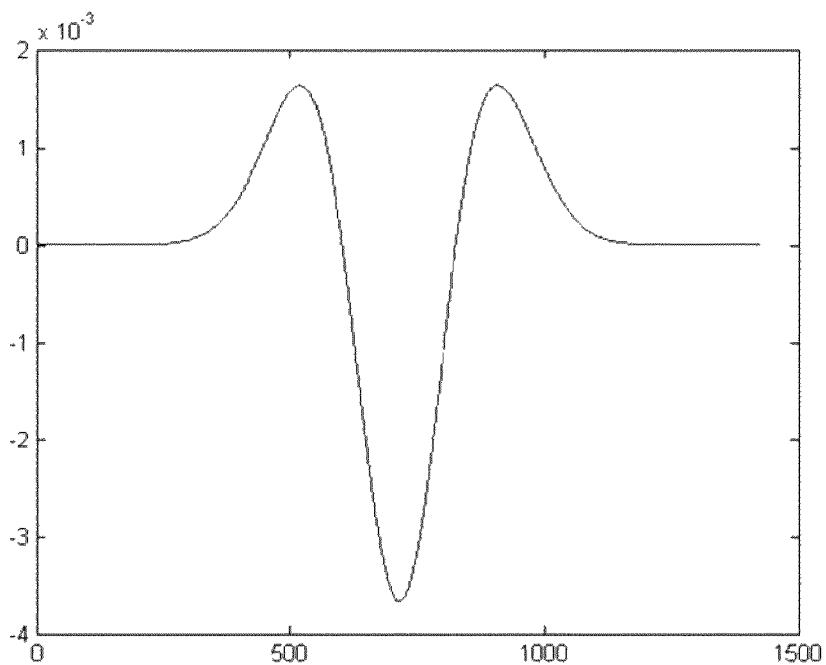

FIGS. 6a and 6b show examples of kernels which are second derivatives of a Gaussian function for use in the convolution process at different scales.

Other kernels may be used in other embodiments of the present invention. Some examples for such kernels include: a matching filter which may be tailored to a specific defect by averaging many appearances of the defect; a gabor filter, sine and cosine filters and any type of high pass and band pass filters.

In one embodiment, two or more kernels may be used. For example, a first kernel may be the second derivative of a Gaussian function, and a second kernel may be the inverse of the first kernel (i.e. the second derivative of a Gaussian flipped about the x-axis). The first kernel is used in the detection of light bands, and the second kernel is used in the detection of dark bands. It is advantageous to be able to detect both light bands and dark bands independently because the perceived severity of these bands is subjective, and varies between human observers.

By identifying the zero crossings in the derivative of the results of the convolution, it is possible to identify the local maximum for a given band. This can be repeated at each of the plurality of scales. It is desirable to be able to identify the local maxima of each band at each scale because the inventors have found that variations in the attributes of the local maxima (i.e. the value of the local maxima) may be used in the determination of the severity rating for that band.

The local maxima for each band at each scale are determined, at step 34, by identifying the zero-crossing points of the derivative of the convolution results.

It is possible to link all of the identified local maxima for a particular band in each of the plurality of scales through reference to the location of each of the identified local maxima in each scale, and determining whether the local maxima belongs to the same band.

The kernel width W is the distance from the location of the maximum of the kernel, to the location of the minimum of the kernel, multiplied by a constant, for example 0.6. A local maxima (zero-crossing of the derivative) identified at location LOC in one scale, may be linked with local maxima identified in the region [LOC−W, LOC+W] in other scales.

As noted above, the profile is convolved with the kernel at a plurality of scales. A first convolution step, at a first scale (the coarsest scale), yields a first value for the identified maxima (i.e. at the zero-crossing). This is achieved for each band (i.e. for each identified zero crossing) in the printed sheet.

For each band, the first values of the identified maxima are stored, at step 36, as an indication of a first severity rating for each band, together with position information for each band. Subsequent convolution steps, at progressively finer scales, yield subsequent values for the identified maxima in each scale. As described above, the local maxima which are identified at each of the plurality of scales may be attributed to a particular band in dependence on the position of the local maxima in each scale.

In one embodiment of the present invention, all of the identified maxima for each band at each scale are stored. After gathering all local maxima and related features of all bands, the identified maxima that correspond to the same band are compared to determine which of the stored maxima is the representative of this band. In other words, the corresponding weighted convolution at the maximum's location has the greatest value. The representative maximum and related features are stored as an indication of the severity rating for that band.

In an alternative embodiment, a comparison is carried out at each of the plurality of scales. For example, after the first value is stored at step 36, a second convolution process at a second (finer) scale yields, at step 38, a second value for the identified maxima. This second value is compared, at step 42, with the first stored value, and if the second value is greater than the first stored value, the first stored value is over-written, at step 42, with the second value. This comparison occurs at each scale, such that at the end of the process, the stored value of the identified maxima is the greatest value of each identified maxima at each scale. It is this stored value which becomes the indication of the severity rating for that band.

The number of scales at which the convolution occurs may vary depending upon the application of the MBM tool 10. The number of scales may be selected depending upon the printing process under test. However, it is to be appreciated that the present invention does not reside in the number of scales used, rather that the analysis is performed at a plurality of scales.

As discussed above in relation to FIGS. 2a and 2b, neighbouring bands in the vicinity of a current band being evaluated may affect the results of the evaluation. Therefore, it is preferable to be able to compensate for the presence of neighbouring bands.

Figure 7A:
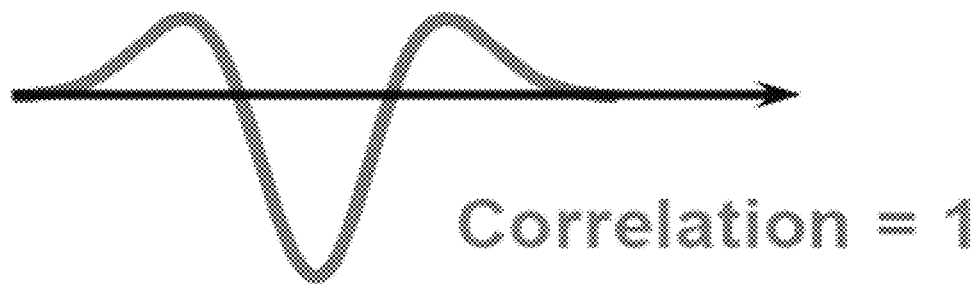
FIGS. 7a and 7b are illustrations of the convolution responses when there are no neighbouring bands (FIG. 7a), and when there is a neighbouring band (FIG. 7b)
Figure 7B:
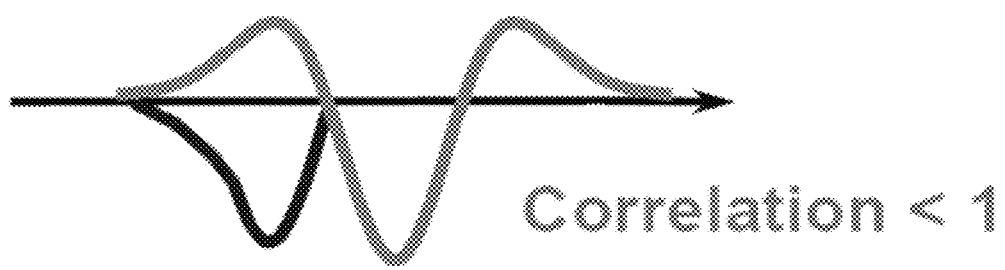

The effect of neighbouring bands is shown in FIGS. 7a and 7b. As shown in FIG. 7a, when there are no neighbouring bands present, the convolution response results in the maximal response, and the correlation equals 1. However, as shown in FIG. 7b when there is a neighbouring band, the convolution response no longer obtains the maximal response, and the correlation is less than 1. In other words, the presence of neighbouring bands results in a reduction of the convolution response.

The reduction in the convolution response is compensated for, at step 40, prior to the comparing and overwriting the stored values, at step 42. One example of a method for compensating includes multiplying the resultant convolution response for a local portion of the profile by a compensation function, $r(t,d)$, and this compensation function depends on the present scale of the convolution, t, and on the determined distance between the current band and the closest neighbouring band, d. One example of a suitable $r(t,d)$ is a Gaussian function.

It is possible to fine tune the MBM tool by applying weighting functions at each of the plurality of scales. The inventors of the present invention identified through a training set of data that initial results obtained by the MBM tool differed slightly from results obtained by human observers. Since the invention is concerned with the perceptual severity of the bands, the results of the human observers are definitive, and the results of the MBM tool should be consistent with the human observer results. The inventors devised a plurality of weighting functions, which when applied to the convolution results, made the overall MBM results more consistent with those of the human observers.

In one embodiment, the weightings are applied, at step 44, in each scale, after the convolution and compensations steps. In other words, the stored values are the maximal weighted values and the comparison between values is between a weighted convolution value at current local maxima in a current scale, and a stored maximal weighted value for the same band.

Alternatively, the weighting functions may be applied after all of the maxima in each scale have been identified. The determination of the maximal weighted value is evaluated after the weighting functions have been applied.

In either case, the BSA determines, at step 46, a maximal weighted value for each band for use in reporting the results of the analysis.

With reference to FIG. 4, the BSA 16 further comprises: a local maxima locator 50 for locating, from profile analysis results, the local maxima in the profile throughout the plurality of different scales; a band tracer 52, for associating each local maxima with a band in dependence on the location of the local maxima throughout the printed sheet; a maxima comparator 54, for determining, from the profile analysis results obtained for each band in each scale, the maximum value associated with the local maxima, and an output module 56, for outputting an evaluation of the severity of at least one band in the printed sheet on the basis of the determined maximum value for that band.

The BSA 16 may also comprise: a compensator 58, for compensating for neighbouring bands by multiplying the convolution results by the compensation factor (r(t,d)) to obtain compensated convolution results; and a weighting module 60, for applying an appropriate weighting function to the identified local maxima at each of the plurality of scales, wherein the determined maximum value is the maximal weighted value for that band.

The memory store 18 may be arranged to store a plurality of profiles, maxima values and locations for those profiles, compensation factors, and weighting functions.

In each scale different weighting functions are added to the features of the band. In one embodiment of the present invention, the weighting functions are determined on the basis of human visual models in the frequency domain (MTF). The inventors have found that variations of known MTFs, which are originally extracted for harmonic bands, do not match human perception of singular bands. As a result, a specific human visual function was developed in order to weight the relative severity of the band as a function of band width. These weighting functions were developed by the present inventors through a process of trial and error on the training set of data, and a representation of the weighting function is shown in FIG. 8.

Also shown in FIG. 8 is a logarithmic representation of the scale space, which shows the band locations along the page and representations of the maximal values of the bands at each scale. The weighting function shown on the right of FIG. 8 varies depending on the scale. The blown-up section of FIG. 8 shows how the features of the bands may be traced through each of the plurality of scales.

A plurality of independent tests, one of which is detailed in the below, showed that these weightings hold true not just for the training set but for real-life data sets.

Figure 9:
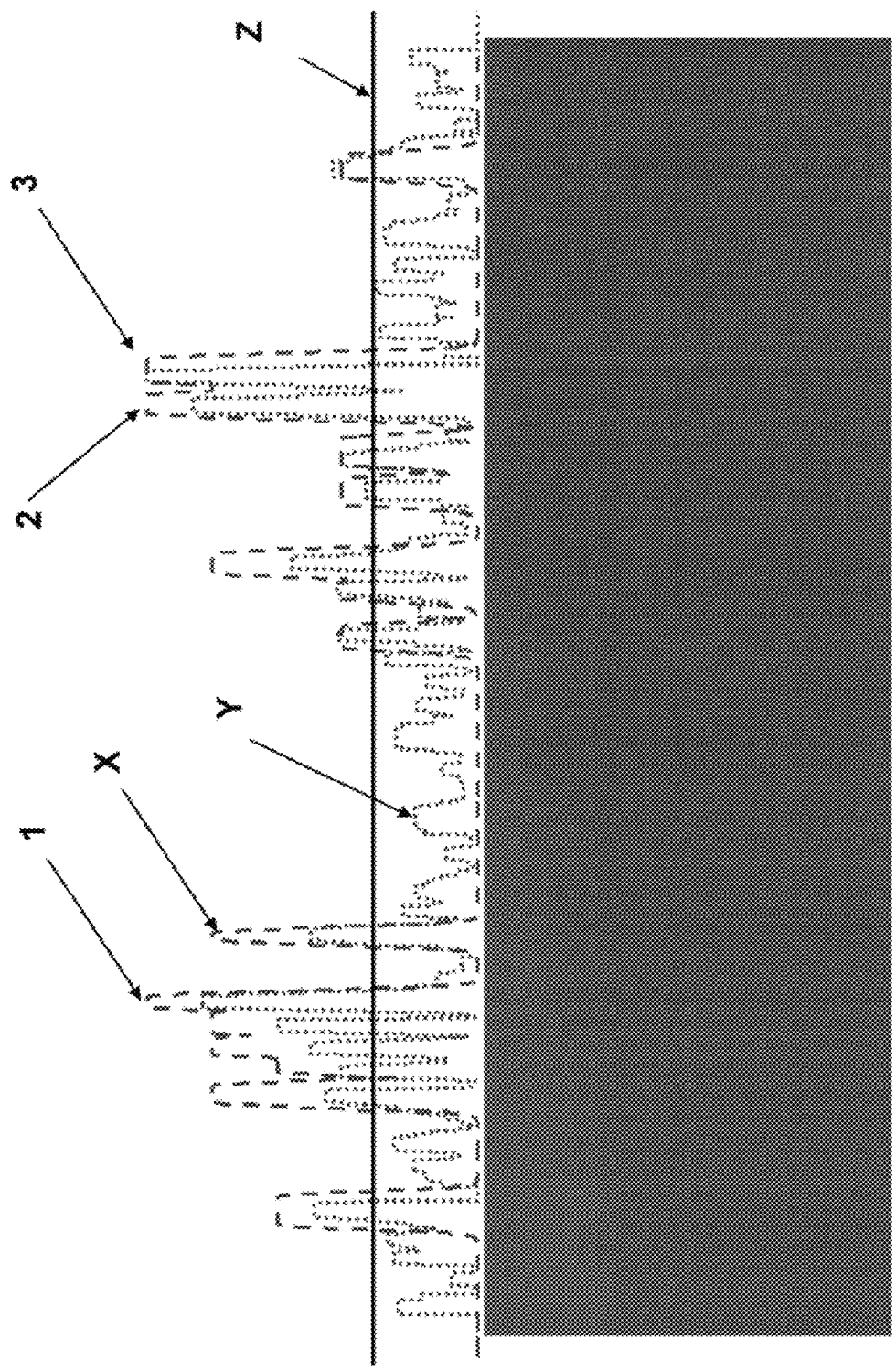
FIG. 9 is an illustration slowing the results from MBM tool in comparison to results from a committee of human observers.

FIG. 9 shows a comparison between results obtained using a committee of human observers (dashed line X) and the MBM tool (dotted line Y).

The results are values/scores that describe the severity of the band that might exist in each location along the print. Those scores are relative to other scores for the print, and are not given in absolute terms.

A comparison of the MBM results and the human observer results for the same printed sheet shows that there is an overall agreement between the relative marks given to the bands by the tool and by the human evaluator. For example, the three bands (numbered 1, 2, and 3), corresponding to bands in FIGS. 1a to 1c, which are evaluated as having the highest score possible by the human evaluator are also evaluated as having the high scores by the MBM tool. However, the tool distinguishes between bands 1 and 2 as being of lower severity than band 3.

The tool is more exact than the human observer because there is a limitation in the number of severity ratings which a human observer can distinguish between: this is not a limitation in the MBM tool. For example, a human observer may be able to attribute a severity rating from 0 to 5 for each band, where 0 indicates no band, and 5 indicates the most severe rating for a band. The MBM tool is able to attribute a finer scale for the severity rating and so it is possible for the tool to distinguish that band 3 is more severe than bands 1 and 2. The reason for this is that the MBM tool is not limited to providing integer levels of severity. Rather the MBM tool calculates a score for each band, and the higher the score, the more severe the band.

Also shown in FIG. 9 is a threshold value (solid line z). This threshold value distinguishes scores given by the MBM tool which relate to bands, for which there is also a perceived severity identified by human observers, from those results which may be attributed to noise or deemed to be insufficiently severe to warrant further investigation.

The threshold value may be set during calibration of the MBM tool. Alternatively, this level may be set by a committee of human observers who decide which bands are acceptable and which are not.

To evaluate the effectiveness of the tool, a perceptual test is used, to corroborate that the results given by the MBM tool can be trusted. An overview of a suitable test is provided below.

The test printed sheet contains seventeen bands which represent a variety of bands resulting from a printing process under test. The seventeen bands are printed in eight sheets, where some of the sheets contain more than one band, and where there are up to four bands per sheet. The seventeen bands are identified by alphanumeric letters (see Table 1 below). Thirty human observers (numbered 1 to 30) volunteered to take part in the test, all of them experienced in bands evaluation for the printing process under test. During the test, each of the thirty observers ranked the bands from "1" (the least disturbing band) to "17" (the most disturbing band). The ranking was done in normal work environment conditions.

Table 1 below shows the ranks given to the bands by each of the human evaluators. These results are collated to give a committee result for each band. This may be simply the average rank from all of the observer ranks (i.e. the sum of all rankings divided by the number of human observers). However, it is to be appreciated that there are other ways in which a committee score may be derived from the results in Table 1.

When a committee rank is known, it is possible to evaluate a particular ranking using a Rank Agreement Measure (RAM) which is used to denote the agreement between this particular rank and the committee rank. There are many ways to evaluate RAM, as will be appreciated by a person skilled in the art. One example is the mean value of a Spearman Rank Correlation, which is used to denote the correlation between the particular rank and each of the committee ranked-votes.

Figure 10:
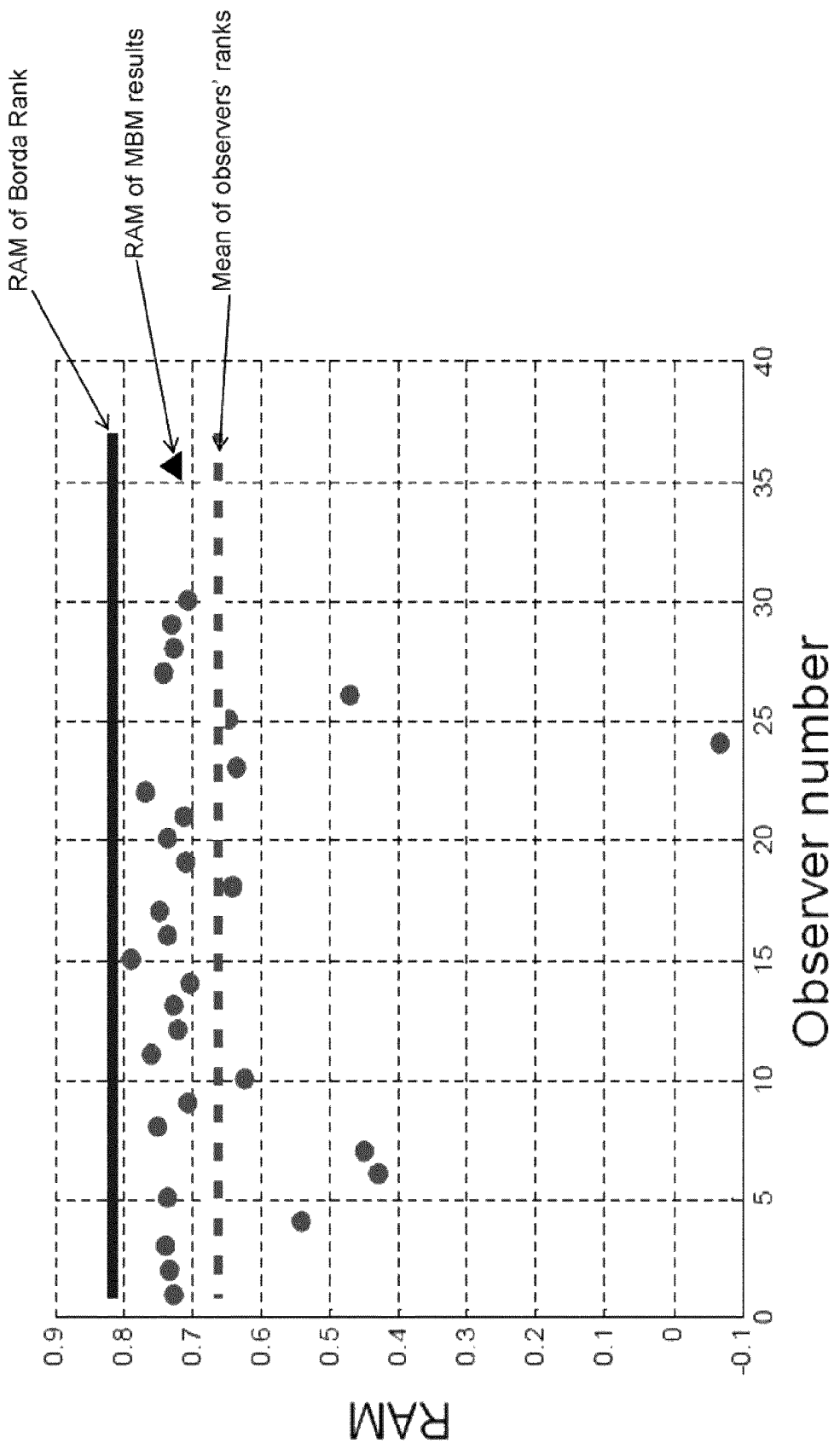
FIG. 10 is a plot of test results for seventeen bands with reference to the mean of the committee results, and a Rank Agreement Measure (RAM) of the best theoretical match to the committee results.

A RAM value is attributed to each of the observer's ranks, as shown by the round dots in FIG. 10. The dashed line denotes the mean of the observers ranks. The best theoretical match to the committee rank is known as the Borda rank, and it's RAM is denoted by the solid line. This Borda rank represents the best case RAM which may be expected from the committee results, and a person skilled in the art will appreciate how the Borda rank is determined.

A person skilled in the art will appreciate that there are other methods for tuning or calibrating the MBM tool, for example non-parametric search methods, such as Gauss Newton, steepest decent, design of experiment, genetic algorithms, simulated annealing, neural networks, and other addi-

TABLE 1

| Observer Number | Position of band named | | | | | | | | | | | | | | | | |
|---|---|---|---|---|---|---|---|---|---|---|---|---|---|---|---|---|---|
| | A | B | C | D | E | G | H | I | K | L | M | N | O | P | R | S | Y |
| 1 | 6 | 16 | 3 | 4 | 17 | 2 | 9 | 15 | 10 | 11 | 13 | 5 | 14 | 8 | 1 | 12 | 7 |
| 2 | 7 | 17 | 8 | 3 | 5 | 1 | 12 | 16 | 9 | 13 | 14 | 6 | 15 | 11 | 2 | 10 | 4 |
| 3 | 2 | 16 | 5 | 3 | 10 | 1 | 7 | 17 | 12 | 11 | 15 | 4 | 14 | 13 | 6 | 9 | 8 |
| 4 | 5 | 13 | 8 | 4 | 12 | 1 | 17 | 14 | 2 | 15 | 11 | 6 | 16 | 10 | 7 | 3 | 9 |
| 5 | 3 | 17 | 7 | 4 | 5 | 1 | 13 | 14 | 10 | 15 | 12 | 8 | 16 | 11 | 2 | 9 | 6 |
| 6 | 5 | 17 | 13 | 10 | 2 | 6 | 11 | 14 | 7 | 3 | 8 | 1 | 15 | 12 | 4 | 16 | 9 |
| 7 | 4 | 16 | 2 | 10 | 7 | 3 | 15 | 17 | 5 | 9 | 12 | 14 | 6 | 8 | 1 | 13 | 11 |
| 8 | 4 | 17 | 5 | 6 | 7 | 2 | 13 | 16 | 9 | 10 | 12 | 3 | 15 | 11 | 1 | 14 | 8 |
| 9 | 2 | 15 | 12 | 5 | 14 | 3 | 8 | 13 | 6 | 10 | 17 | 4 | 16 | 11 | 1 | 9 | 7 |
| 10 | 4 | 16 | 5 | 11 | 17 | 3 | 7 | 15 | 13 | 14 | 10 | 1 | 12 | 9 | 2 | 8 | 8 |
| 11 | 3 | 16 | 5 | 6 | 8 | 2 | 9 | 12 | 10 | 15 | 11 | 4 | 17 | 13 | 1 | 14 | 7 |
| 12 | 3 | 16 | 7 | 4 | 6 | 2 | 9 | 13 | 8 | 15 | 12 | 1 | 17 | 11 | 5 | 14 | 10 |
| 13 | 7 | 16 | 5 | 3 | 12 | 1 | 10 | 9 | 11 | 15 | 14 | 4 | 17 | 13 | 2 | 8 | 6 |
| 14 | 2 | 17 | 8 | 1 | 7 | 3 | 6 | 11 | 13 | 16 | 15 | 5 | 14 | 10 | 4 | 12 | 9 |
| 15 | 4 | 17 | 5 | 3 | 12 | 1 | 9 | 15 | 8 | 10 | 13 | 6 | 16 | 11 | 2 | 14 | 7 |
| 16 | 4 | 17 | 6 | 1 | 11 | 2 | 7 | 10 | 12 | 14 | 15 | 5 | 16 | 8 | 3 | 13 | 9 |
| 17 | 2 | 17 | 8 | 3 | 10 | 1 | 7 | 13 | 6 | 14 | 12 | 4 | 16 | 11 | 5 | 15 | 9 |
| 18 | 1 | 16 | 9 | 7 | 17 | 2 | 6 | 14 | 11 | 5 | 15 | 8 | 13 | 10 | 3 | 12 | 4 |
| 19 | 4 | 17 | 8 | 5 | 13 | 2 | 3 | 15 | 9 | 14 | 12 | 1 | 16 | 10 | 6 | 11 | 7 |
| 20 | 2 | 16 | 6 | 5 | 17 | 1 | 7 | 15 | 10 | 12 | 13 | 3 | 14 | 9 | 4 | 11 | 8 |
| 21 | 5 | 16 | 6 | 3 | 17 | 1 | 9 | 10 | 11 | 12 | 14 | 2 | 15 | 8 | 4 | 13 | 7 |
| 22 | 4 | 17 | 5 | 6 | 14 | 1 | 8 | 11 | 9 | 15 | 13 | 3 | 16 | 10 | 2 | 12 | 7 |
| 23 | 3 | 17 | 10 | 4 | 6 | 2 | 11 | 5 | 12 | 13 | 14 | 8 | 16 | 15 | 1 | 9 | 7 |
| 24 | 8 | 16 | 13 | 12 | 17 | 9 | 11 | 7 | 10 | 3 | 4 | 15 | 2 | 14 | 5 | 6 | 1 |
| 25 | 8 | 17 | 1 | 3 | 11 | 7 | 9 | 14 | 4 | 13 | 15 | 5 | 16 | 10 | 6 | 12 | 2 |
| 26 | 6 | 14 | 3 | 5 | 4 | 2 | 16 | 15 | 7 | 13 | 12 | 17 | 11 | 9 | 1 | 8 | 10 |
| 27 | 1 | 16 | 7 | 5 | 13 | 2 | 8 | 15 | 9 | 10 | 11 | 3 | 17 | 12 | 6 | 14 | 4 |
| 28 | 3 | 17 | 4 | 5 | 7 | 1 | 14 | 13 | 9 | 12 | 15 | 10 | 16 | 11 | 2 | 8 | 6 |
| 29 | 2 | 16 | 9 | 3 | 6 | 1 | 8 | 12 | 11 | 14 | 17 | 7 | 15 | 10 | 4 | 13 | 5 |
| 30 | 4 | 17 | 2 | 11 | 10 | 3 | 6 | 16 | 7 | 9 | 15 | 6 | 14 | 13 | 1 | 12 | 5 |

Using the MBM tool 10 to analyze the bands in the same printed sheets as above, the tool gives a mark (score) to each of the seventeen bands, as detailed in Table 2.

tional optimization/search methods. The basic requirements for these methods is to sample the parameter space, and for each set of parameters to calculate the "cost function" which

TABLE 2

| | Band | | | | | | | | | | | | | | | | |
|---|---|---|---|---|---|---|---|---|---|---|---|---|---|---|---|---|---|
| | A | B | C | D | E | G | H | I | K | L | M | N | O | P | R | S | Y |
| position | 3 | 17 | 6 | 8 | 9 | 2 | 13 | 7 | 10 | 14 | 15 | 5 | 16 | 11 | 1 | 12 | 4 |
| Mark | .144 | .466 | .201 | .230 | .232 | .141 | .315 | .226 | .262 | .318 | .337 | .175 | .42 | .277 | .112 | .281 | .164 |

The bands are ordered on the basis of their scores, in terms of their relative severity, and are assigned a relative rank (also known as an MBA rank) from 0 to 17.

Tying these results together, Table 2 shows Band B having the highest mark, and therefore being the most severe. This corresponds with the results for Band B in Table 1, which the vast majority of human observers ranking Band B as a rank 16 or 17 band.

The RAM of the MBM tool results (also obtained using the mean Spearman Rank Correlation) is denoted by a triangle symbol in FIG. 9. As shown, the RAM, of the MBM tool results, is higher than the mean observer's RAM. This indicates that the MBM tool results represent the actual committee ranks better than the mean human observer.

The MBM tool may be tuned and tested for bands that appear in Hewlett-Packard® Indigo print presses. However, it is to be appreciated that the tool may be tuned for other presses and printers as well.

is the agreement between tool's scores to human scores until you find the optimal set of parameters. The methods differ in the way they choose which set of parameters to check. However, they provide a suitable method for calibrating the MBM tool to the printing process being tested.

The invention claimed is:

1. A method for evaluating printing defects, in printing technology, the method comprising:
   receiving a captured image of a printed sheet;
   generating a profile, of the printed sheet, representative of tonal variations in the printed sheet;
   analyzing the profile in a plurality of different scales;
   assessing the significance of one or more features of a printing defect throughout the plurality of different scales; and
   evaluating from the assessed significance of the one or more features, in each of the plurality of different scales, the severity of the printing defect.

2. The method as claimed in claim 1, wherein the analyzing step comprises convolving the profile with at least one kernel in the plurality of scales to produce convolution results for each of the plurality of scales to enable analysis of the profile in the plurality of different scales.

3. The method as claimed in claim 2, wherein the analyzing step further comprises deriving the convolution results for each of the plurality of different scales; and the assessing step comprises assessing the significance of the one or more features of a printing defect by locating at least one local maxima by identifying at least one zero-crossing in the derivative of the convolution results.

4. The method as claimed in claim 3, further comprising:
associating the features corresponding to at least one local maxima with a printing defect in at least one of the plurality of different scales, and
gathering all of the local maxima for each printing defect, in dependence on the location the one local maxima, throughout the plurality of different scales.

5. The method as claimed in claim 4, further comprising:
determining a most significant local maxima, from the at least one local maxima associated with the printing defect; and
outputting an evaluation of the severity of the printing defect on the basis of a value associated with the most significant local maxima.

6. The method as claimed in claim 5, further comprising applying an appropriate weighting function to the features corresponding to the local maxima at each of the plurality of scales, wherein the determined most significant local maxima is the maximal weighted value for the printing defect.

7. The method as claimed in claim 1, wherein the printing defect is a band defect, and the tonal variations are grey-scale variations, the generating step comprising averaging the grey value along in the direction of the band defect.

8. The method as claimed in claim 1, wherein the at least one kernel may be the second derivative of a Gaussian.

9. The method as claimed in claim 1, wherein the printing defects are band defects and there are first and second kernels, the first kernel for identifying light bands is the second derivative of a Gaussian, and the second kernel for identifying dark bands is the inverse of the first kernel.

10. The method as claimed in claim 2, further comprising compensating for neighbouring printing defects by multiplying the convolution results by a compensation factor (r(t,d)) to obtain compensated convolution results.

11. The method as claimed in claim 10, wherein the analyzing step further comprises deriving the compensated convolution results for each of the plurality of different scales; and the assessing step comprises assessing the significance of the one or more features of a printing defect by locating local maxima, relating to the printing defect, for at least one of the plurality of different scales, by identifying at least one zero-crossing in the derivative of the compensated convolution results.

12. The method as claimed in claim 10, wherein the compensation factor is dependent on a current scale of the convolution (t) and a determined distance (d) between a current printing defect being evaluated and a closest neighbouring printing defect.

13. The method as claimed in claim 1, wherein the outputting step comprises analyzing a plurality of sheets to provide a set of results data for evaluating the severity of at least one printing defect.

14. A diagnostic tool for evaluating printing defects, in printing technology, the tool comprising:

a receiver for receiving a scan of a printed sheet;
a profile generator for generating a profile, of the printed sheet, representative of tonal variations in the printed sheet;
a profile analyzer for analyzing the profile in a plurality of different scales and for assessing the significance of one or more features of a printing defect throughout the plurality of different scales;
wherein the profile analyzer is arranged to evaluate, from the assessed significance of the one or more features the severity of the printing defect.

15. A diagnostic tool as claimed in claim 14, further comprising a local maxima locator for locating, from profile analysis results, at least one local maxima in the profile analysis results, throughout the plurality of different scales.

16. A diagnostic tool as claimed in claim 15, further comprising a band tracer for associating the at least one local maxima with a printing defect in dependence on the location of the local maxima throughout the printed sheet.

17. A diagnostic tool as claimed in claim 16, further comprising:
a maxima comparator for determining, a most significant local maxima, from the at least one local maxima associated with the printing defect; and
an output module for outputting an evaluation of the severity of the printing defect on the basis of a value associated with the most significant local maxima.

18. A diagnostic tool as claimed in claim 15, further comprising a weighting module for applying an appropriate weighting function to the at least one local maxima at each of the plurality of different scales, wherein the determined maximum value is the maximal weighted value for the printing defect.

19. The diagnostic tool as claimed in claim 14, wherein the profile analyser is arranged to convolve the profile with at least one kernel in the plurality of different scales to produce convolution results for each of the plurality of scales, the diagnostic tool further comprising a compensator arranged to compensate for neighbouring printing defects by multiplying the convolution results by a compensation factor (r(t,d)) to obtain compensated convolution results.

20. A printer comprising a diagnostic tool as claimed in claim 14.

21. The printer as claimed in claim 20, further comprising a scanning device for scanning a plurality of printed sheets.

22. A system for evaluating printing defects, in printing technology, the system being arranged to:
receive a captured image of a printed sheet;
generate a profile, of the printed sheet, representative of tonal variations in the printed sheet;
analyze the profile in a plurality of different scales;
assess the significance of one or more features of a printing defect throughout the plurality of different scales; and
evaluate from the assessed significance of the one or more features, in each of the plurality of different scales, the severity of the printing defect;
wherein the system comprises a central server arranged to receive a plurality of print evaluation inputs relating to printed images from a plurality of printing devices, said print evaluation inputs being one of: captured images of printed sheets, and the generated profiles.

23. The system as claimed in claim 22, wherein the central server is arranged to evaluate the severity of the printing defect after applying an appropriate weighting function to the one or more features of the printing defect, the central server being further arranged to select a most appropriate weighting function from a plurality of weighting functions in dependence on the type of print defect and printing device from where the printing defect originates.

24. The system as claimed in claim 22, wherein the central server is arranged to evaluate the severity of the printing defect after applying an appropriate weighting function to the one or more features of the printing defect, the central server being further arranged to select a most appropriate kernel from a plurality of kernels in dependence on the type of print defect and printing device from where the printing defect originates.

* * * * *